United States Patent
Jha et al.

(10) Patent No.: US 10,464,692 B2
(45) Date of Patent: Nov. 5, 2019

(54) EXTERIOR AIRCRAFT LIGHT UNIT AND AIRCRAFT COMPRISING THE SAME

(71) Applicant: Goodrich Lighting Systems GmbH, Lippstadt (DE)

(72) Inventors: Anil Kumar Jha, Lippstadt (DE); Andre Hessling-Von Heimendahl, Koblenz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 0 days.

(21) Appl. No.: 15/648,589

(22) Filed: Jul. 13, 2017

(65) Prior Publication Data

US 2018/0016032 A1 Jan. 18, 2018

(30) Foreign Application Priority Data

Jul. 16, 2016 (EP) ..................................... 16179832

(51) Int. Cl.
*B64D 47/02* (2006.01)
*B64D 47/06* (2006.01)

(52) U.S. Cl.
CPC .............. *B64D 47/06* (2013.01); *B64D 47/02* (2013.01)

(58) Field of Classification Search
CPC ......... B64D 47/02; B64D 47/04; B64D 47/06
See application file for complete search history.

(56) References Cited

U.S. PATENT DOCUMENTS

| | | | | |
|---|---|---|---|---|
| 2,365,504 A | * | 12/1944 | Adler, Jr. ............... | H01K 1/325 313/115 |
| 2,605,384 A | * | 7/1952 | Adler, Jr. ............... | B64D 47/06 362/240 |
| 5,813,744 A | * | 9/1998 | Altebarmakian ...... | B64D 47/04 244/1 R |
| 6,371,637 B1 | * | 4/2002 | Atchinson ............. | F21V 19/005 362/249.04 |
| 6,461,029 B2 | * | 10/2002 | Gronemeier ......... | B60Q 1/2696 340/982 |
| 6,507,290 B1 | * | 1/2003 | Lodhie ................... | B64D 47/06 244/1 R |
| 6,994,459 B2 | * | 2/2006 | Worsdell ............... | B64D 47/06 362/470 |
| 2005/0093718 A1 | * | 5/2005 | Martin ................... | B64D 47/06 340/981 |

(Continued)

FOREIGN PATENT DOCUMENTS

| | | |
|---|---|---|
| EP | 2801528 A1 | 11/2014 |
| EP | 2923951 A1 | 9/2015 |
| EP | 2985229 A1 | 2/2016 |

OTHER PUBLICATIONS

European Search Report for Application No. 16179832.7-1754, dated Jan. 5, 2017. 7 Pages.

*Primary Examiner* — Ali Alavi
(74) *Attorney, Agent, or Firm* — Cantor Colburn LLP (57) ABSTRACT

An exterior aircraft light unit (2) includes a lens cover (50) and at least one light source (6, 6') for emitting light through the lens cover. The lens cover has an aerodynamic front edge (52), separating an impinging air stream during flight, and an aerodynamic front region (54) around the aerodynamic front edge. The light emitted by the at least one light source exits the lens cover only outside the aerodynamic front region.

17 Claims, 8 Drawing Sheets

(56) References Cited

U.S. PATENT DOCUMENTS

2005/0103938 A1\* 5/2005 Butsch ................ B64D 39/00
244/130
2011/0122635 A1\* 5/2011 Calvin ................ B64D 47/06
362/470

\* cited by examiner

EXTERIOR AIRCRAFT LIGHT UNIT AND AIRCRAFT COMPRISING THE SAME

FOREIGN PRIORITY

This application claims priority to European Patent Application No. 16 179 832.7 filed Jul. 16, 2016, the entire contents of which is incorporated herein by reference.

TECHNICAL FIELD

The present invention is in the field of exterior aircraft lighting. In particular, the present invention is in the field of exterior aircraft light units that are exposed to hazardous environmental conditions in use.

BACKGROUND

Almost all aircraft have exterior lighting. Exterior aircraft light units are provided for a variety of different purposes. On the one hand, exterior aircraft light units are provided for active visibility, i.e. for the pilots and/or aircrew to view the outside environment and/or to inspect aircraft structures during flight. On the other hand, exterior aircraft light units are provided for passive visibility, with examples of such exterior aircraft light units being anti-collision light units and navigation light units. Exterior aircraft light units are subject to adverse operating conditions. In particular, exterior aircraft light units have to withstand large temperature variations. Also, many exterior aircraft light units are exposed to large aerodynamic forces and associated wear and tear, in particular due to rain, dust and snow hitting the exterior aircraft light units at high speeds. The wear and tear of the lens covers of these exterior aircraft light units leads to frequent replacements of the lens covers, with these replacements being time-consuming, costly, and resource-intensive. Also, the replacement procedures lead to lengthy down-times of the aircraft.

Accordingly, it would be beneficial to provide exterior aircraft light units that have low maintenance requirements.

SUMMARY

Exemplary embodiments of the invention include an exterior aircraft light unit, comprising a lens cover, and at least one light source for emitting light through the lens cover, wherein the lens cover has an aerodynamic front edge, separating an impinging air stream during flight, and an aerodynamic front region around the aerodynamic front edge, and wherein light emitted by the at least one light source exits the lens cover only outside the aerodynamic front region.

Exemplary embodiments of the invention allow for the provision of exterior aircraft light units with low maintenance requirements. In particular, exemplary embodiments of the invention allow for exterior aircraft light units having long maintenance intervals. Further in particular, exemplary embodiments of the invention allow for the provision of exterior aircraft light units whose lens covers have a long duration of service and do not require frequent replacement. By excluding the aerodynamic front region of the lens cover from being used for light emission, the part of the lens cover that is mostly effected by wear and tear is made irrelevant for the performance of the exterior aircraft light unit. In this way, a degradation of the transparency of the aerodynamic front region over time has no effect on the output light intensity distribution of the exterior aircraft light unit. Therefore, a degradation of the aerodynamic front region of the lens cover does not require a replacement of the lens cover. As compared to previous approaches, where the light emission from the one or more light sources within the exterior aircraft light unit also took place through the aerodynamic front region, maintenance efforts can be greatly reduced, because only the wear and tear of the portions of the lens cover outside the aerodynamic front region is relevant for the performance of the exterior aircraft light unit. By eliminating the relevance of the aerodynamic front region of the lens cover for the performance of the exterior aircraft light unit, which aerodynamic front region is highly effected by wear and tear, maintenance requirements are greatly reduced. A degradation of the aerodynamic front region of the lens cover can no longer result in unacceptable stray light and an unacceptable degradation of the output light intensity distribution of the exterior aircraft light unit. Reducing stray light also decreases glare to the pilots, thus decreasing pilot discomfort and increasing safety.

The term lens cover refers to the outermost structure of the exterior aircraft light unit, through which the light of the exterior aircraft light unit is emitted. The lens cover may be a generally transparent element. In particular, the lens cover may be a generally transparent structure having little or no influence on the output light intensity distribution of the exterior aircraft light unit. The lens cover provides protection for the other components of the exterior aircraft light unit, such as for the at least one light source and the optical system(s) associated therewith. It is also possible that the lens cover plays a role in shaping the output light intensity distribution of the exterior aircraft light unit.

The aerodynamic front edge of the lens cover is defined with respect to the impinging air stream. During flight, in particular during flight at a constant altitude and with an angle of attack of generally 0°, the impinging air stream reaches the lens cover from a particular direction, hereinafter also referred to as the direction of the impinging air stream. The aerodynamic front edge is defined as that portion of the lens cover where the impinging air stream parts for passing the lens cover on two sides thereof. For example, when the exterior aircraft light unit is included in the wing of an airplane, the aerodynamic front edge of the lens cover separates the impinging air stream into a portion passing above the wing and a portion passing below the wing. The aerodynamic front region encompasses respective portions of the lens cover on both sides of the aerodynamic front edge. When the exterior aircraft light unit is included in the wing of an airplane, the aerodynamic front region of the lens cover includes a portion of the lens cover where air passes underneath the wing and a portion of the lens cover where air passes above the wing.

The at least one light source may be at least one light emitting diode (LED). In particular, each of the at least one light source may be an LED. Light emitting diodes are particularly suitable light sources due to their low space requirements, low power requirements, and high reliability/long average life expectancy.

According to a further embodiment, the exterior aircraft light unit further comprises at least one shutter, arranged between the at least one light source and the aerodynamic front region and blocking light emitted by the at least one light source towards the aerodynamic front region. The provision of one or more shutters is a very effective and little complex way of ensuring that no light from the at least one light source passes through the aerodynamic front region of the lens cover. In this way, the erosion of the aerodynamic front region of the lens cover can be made irrelevant with means of low complexity. The at least one shutter may be one or more free-standing structures arranged in the interior of the exterior aircraft light unit and held in place by appropriate mounting elements. It is also possible that the at least one shutter is a light blocking coating or an additional light blocking layer on the inside of the lens cover.

According to a further embodiment, the exterior aircraft light unit further comprises at least one light diverting element, associated with the at least one light source and configured to direct light, emitted by the at least one light source towards the aerodynamic front region, outside the aerodynamic front region. In other words, the exterior aircraft light unit may further comprise one or more optical structures for diverting light that would hit the aerodynamic front region of the lens cover in the absence of such optical elements. The at least one light diverting element may be at least one reflector or at least one lens or a reflector lens combination for diverting the light from the aerodynamic front region. In this way, an exterior aircraft light unit with high efficiency may be provided, because a large portion or all of the light of the at least one light source is used for the output light intensity distribution by being directed through the lens cover outside the aerodynamic front region.

According to a further embodiment, the lens cover has an outside contour and the aerodynamic front region extends in an area where the outside contour has an angle of more than 45° with respect to the impinging air stream. In other words, wherever the outside contour of the lens cover has an angle of more than 45° with respect to the direction of the impinging air stream, this part of the lens cover is defined to be part of the aerodynamic front region and no light is emitted through that part of the lens cover. According to a particular embodiment, the aerodynamic front region extends in an area where the outside contour has an angle of more than 35° with respect to the impinging air stream. In a further particular embodiment, the aerodynamic front region extends in an area where the outside contour has an angle of more than 25° with respect to the impinging air stream. The inventors have found out that most undesired stray light due to an eroded lens cover is generated in the area of the lens cover where the outside contour has an angle of more than 35° with respect to the impinging air stream. By defining the aerodynamic front region to be that area where the outside contour has an angle of more than 35° with respect to the impinging air stream and by avoiding the exiting of light through that portion of the lens cover, the issues of undesired stray light due to the eroded lens cover can be greatly reduced or even entirely eliminated. By defining the aerodynamic front region as that area where the outside contour has an angle of more than 45° with respect to the impinging air stream, the most severe production of stray light immediately around the aerodynamic front edge can be eliminated. On the other hand, by eliminating the exiting of light in an area where the outside contour has an angle of more than 25° with respect to the impinging air stream, even areas of low stray light generation, whose erosion may be caused by aircraft angles of attack that are not constantly present and whose erosion may be less problematic, may be eliminated. Above angles are defined as the angles between the tangents to the outside contour of the lens cover and the direction of the impinging air stream. For example, the feature that the aerodynamic front region extends in an area where the outside contour has an angle of more than 35° with respect to the impinging air stream means that the aerodynamic front region extends in an area where the tangent to the outside contour has an angle of more than 35° with respect to the direction of the impinging air stream.

According to a further embodiment, the lens cover has a first lens cover portion and a second lens cover portion, with the first and second lens cover portions being positioned on opposite sides of the aerodynamic front edge, and the at least one light source comprises at least one first light source, arranged closer to the first lens cover portion than to the second lens cover portion, and at least one second light source, arranged closer to the second lens cover portion than to the first lens cover portion. With the at least one first light source being arranged closer to the first lens cover portion and the at least one second light source being arranged closer to the second lens cover portion, the light from the first and second light sources can be coupled out of the lens cover through the respectively closer lens cover portions at favourable angles. In this way, a large portion of the light from the first and second light sources can be coupled out of the lens cover outside the aerodynamic front region in an effective manner.

According to a further embodiment, at least a majority of the light, emitted by the at least one first light source and exiting the lens cover outside the aerodynamic front portion, exits the lens cover through the first lens cover portion and at least a majority of the light, emitted by the at least one second light source and exiting the lens cover outside the aerodynamic front portion, exits the lens cover through the second lens cover portion. In other words, out of the light emitted by the at least one first light source and eventually exiting the lens cover and contributing to the overall output light intensity distribution of the exterior aircraft light unit, a large portion or substantially all exits the lens cover through the first lens cover portion. Analogously, out of the light emitted by the at least one second light source and eventually exiting the lens cover and contributing to the overall output light intensity distribution of the exterior aircraft light unit, a large portion or substantially all exits the lens cover through the second lens cover portion. The term at least a majority of the light may refer to a portion of at least 70%, in particular at least 80%, further in particular at least 90% of the light.

According to a further embodiment, the at least one first light source has at least one first optical system associated therewith and the at least one second light source has at least one second optical system associated therewith. For example, the at least one light source and the associated at least one first optical system may be one light source, such as one LED, and one lens associated therewith. Analogously, the at least one second light source and the associated at least one second optical system may be one light source, such as one LED, and one lens associated therewith. It is also possible that the at least one first light source and/or the at least one second light source is a row of a plurality of light sources, respectively. The at least one optical system may then be a plurality of optical systems or a joint optical system, such as a joint lens or a joint reflector. The at least one first optical system is provided for shaping a first output light intensity distribution, i.e. it is provided for transforming the light from the at least one first light source into a first output light intensity distribution. Analogously, the at least one second light source is provided for shaping a second output light intensity distribution, i.e. it is provided for transforming the light from the at least one second light source into the second output light intensity distribution. The first and second output light intensity distributions jointly form the basis for the overall output light intensity distribution of the exterior aircraft light unit. The overall output light intensity distribution of the exterior aircraft light unit may be the sum of the first output light intensity distribution and the second output light intensity distribution. This is the case if all light from the at least one first light source and the at least one second light source is directed through the lens cover outside of the aerodynamic front region of the lens cover and is therefore not blocked before reaching the aerodynamic front region of the lens cover. In this case, the first and second optical systems also have the function of light diverting elements that direct the light from the first and second light sources around the aerodynamic front region. However, it is also possible that the overall output light intensity distribution of the exterior aircraft light unit is different from the sum of the first and second output light intensity distributions. In particular, the overall output light intensity distribution of the exterior aircraft light unit may be the sum of the first and second output light intensity distributions minus the light blocked on its way to the aerodynamic front region.

According to a further embodiment, the at least one first optical system and the at least one second optical system are of corresponding design. In other words, the first output light intensity distribution, as shaped by the at least one first optical system, and the second output light intensity distribution, as shaped by the at least one second optical system, may be the same or may be the same except for a rotation thereof. In a particular embodiment, the first and second light sources and the first and second optical systems are the result of a doubling of the light source and associated optical system, as used in prior approaches. The doubling of the output light intensity distribution on the inside of the lens cover may ensure the presence of enough light output for satisfying the overall output light intensity distribution of the exterior aircraft light unit, as desired by aircraft designers and/or as required by aviation regulations, despite losing light output due to the blocking of light towards the aerodynamic front region of the lens cover. In this way, the issues regarding undesired stray light due to erosion of the aerodynamic front region of the lens cover may be greatly reduced or eliminated without the need to design new optical systems for shaping the output light intensity distribution.

According to a further embodiment, the exterior aircraft light unit has an overall output light intensity distribution and only light from the at least one first light source contributes to the overall output light intensity distribution in the direction of the impinging air stream. In particular, the first lens cover portion may be an upper lens cover portion and the second lens cover portion may be a lower lens cover portion. The upper lens cover portion may extend farther from the aerodynamic front edge than the lower lens cover portion. The light from the at least one first light source, which is arranged closer to the upper lens cover portion, may be more effectively coupled out of the lens cover towards the direction of the impinging air stream than the light from the at least one second light source, which is arranged closer to the lower lens cover portion. In this way, the aerodynamic contour of the lens cover may be made use of for effectively coupling the light out of the lens cover.

According to a further embodiment, only light from the at least one first light source contributes to the overall output light intensity distribution in an angular range of +/−5° around the direction of the impinging air stream. In this way, the more effective coupling out of the light through the first lens cover portion may be made use of even in the lower hemisphere, which is mainly illuminated by the at least one second light source.

According to a further embodiment, the at least one first light source is arranged in an upper portion of the exterior aircraft light unit and the at least one second light source is arranged in a lower portion of the exterior aircraft light unit. In particular, the at least one first light source may thus be arranged closer to an upper lens cover portion and the at least one second light source may be arranged closer to a lower lens cover portion. The first lens cover portion may have a larger vertical extension than the second lens cover portion, thus allowing for a particularly effective coupling out of the light.

According to a further embodiment, the lens cover is part of an airplane wing surface or part of an airplane winglet surface or part of a transition surface between an airplane wing and an airplane winglet. In this way, the lens cover may be part of the wing or winglet air foil, thus contributing to the lift generated by the airplane wing. Further in particular, the lens cover is part of the airplane wing front edge or airplane winglet front edge or the front edge of the transition surface between the airplane wing and the airplane winglet, thus separating the impinging air stream in the manner of an airplane wing/winglet.

According to a further embodiment, the exterior aircraft light unit is one of a navigation light unit, an anti-collision light unit, and a combined navigation and anti-collision light unit. In particular, the exterior aircraft light unit is one of a forward navigation light unit, a forward anti-collision light unit, and a combined forward navigation and anti-collision light unit, arranged in an airplane wing, in particular arranged in an airplane wing tip.

Exemplary embodiments of the invention further include an airplane wing, comprising at least one exterior aircraft light unit in accordance with any of the preceding claims, arranged at a leading edge of the airplane wing. The modifications, additional features, and effects discussed above with respect to the exterior aircraft light unit, are analogously applicable to the airplane wing.

Exemplary embodiments of the invention further include an aircraft, such as an airplane or a helicopter, comprising at least one exterior aircraft light unit in accordance with any of the preceding claims. The modifications, additional features and effects discussed above with respect to the exterior aircraft light unit are analogously applicable to the aircraft.

BRIEF DESCRIPTION OF THE DRAWINGS

Further exemplary embodiments of the invention are described in detail with respect to the accompanying drawings, wherein.

DETAILED DESCRIPTION

Figure 1:
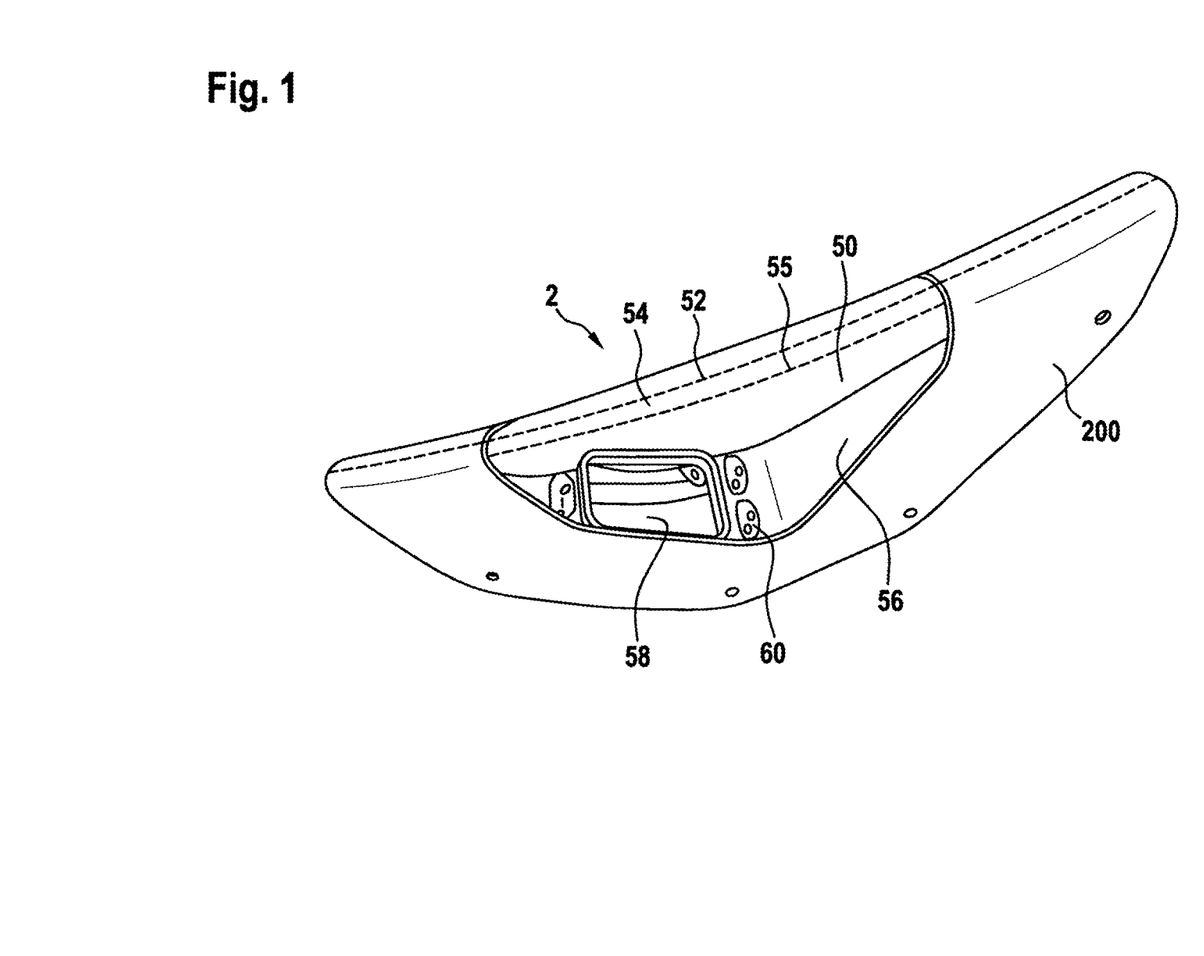
FIG. 1 shows an exterior aircraft light unit in accordance with an exemplary embodiment of the invention, included into an airplane wing, in a perspective view.

FIG. 1 shows an exterior aircraft light unit 2 in accordance with an exemplary embodiment of the invention. The exterior aircraft light unit 2 is included into an airplane wing 200, a portion of which is depicted in FIG. 1. The exterior aircraft light unit 2 is a forward navigation light unit, provided for indicating the flight direction of the airplane to observers. It is also possible that the exterior aircraft light unit 2 is an anti-collision light unit or a combined navigation and anti-collision light unit.

The exterior aircraft light unit 2 has a mounting structure 56, also referred to as housing of the exterior aircraft light unit 2, and a lens cover 50. Together, the mounting structure 56 and the lens cover 50 define an interior space of the exterior aircraft light unit 2. The housing 56 has an opening 58 and mounting elements 60. During manufacture of the exterior aircraft light unit 2, one or more light sources as well as one or more optical elements can be introduced through the opening 58 and can be fixed in position with the help of mounting elements 60. It is also possible that the one or more optical elements and the one or more light sources are fixed in position by other fastening elements. For a clearer illustration of the lens cover 50, the exterior aircraft light unit 2 is shown without such optical elements and light sources in FIG. 1. The light sources and optical elements will be described in detail below.

The lens cover 50 is part of the aerodynamic structure of the airplane wing 200. In particular, the outer contour of the lens cover 50 is part of the air foil contour of the airplane wing 200. The lens cover 50 has an aerodynamic front edge 52, which is shown as a dashed line along the cover lens 50 and the airplane wing 200. The aerodynamic front edge 52 separates an impinging air stream during flight, with a portion of the impinging air stream passing over the top surface of the airplane wing 200 and with another portion of the impinging air stream passing below the airplane wing 200. The lens cover 50 further has an aerodynamic front region 54, which is an area extending around the aerodynamic front edge 52. In particular, the aerodynamic front region 54 extends to the upper side and to the lower side of the aerodynamic front edge 52. One border of the aerodynamic front region 54 is indicated by a dashed line 55. The other border of the aerodynamic front region is to the other side of the aerodynamic front edge 52 and is not visible in the viewing direction of FIG. 1.

Figure 2A:
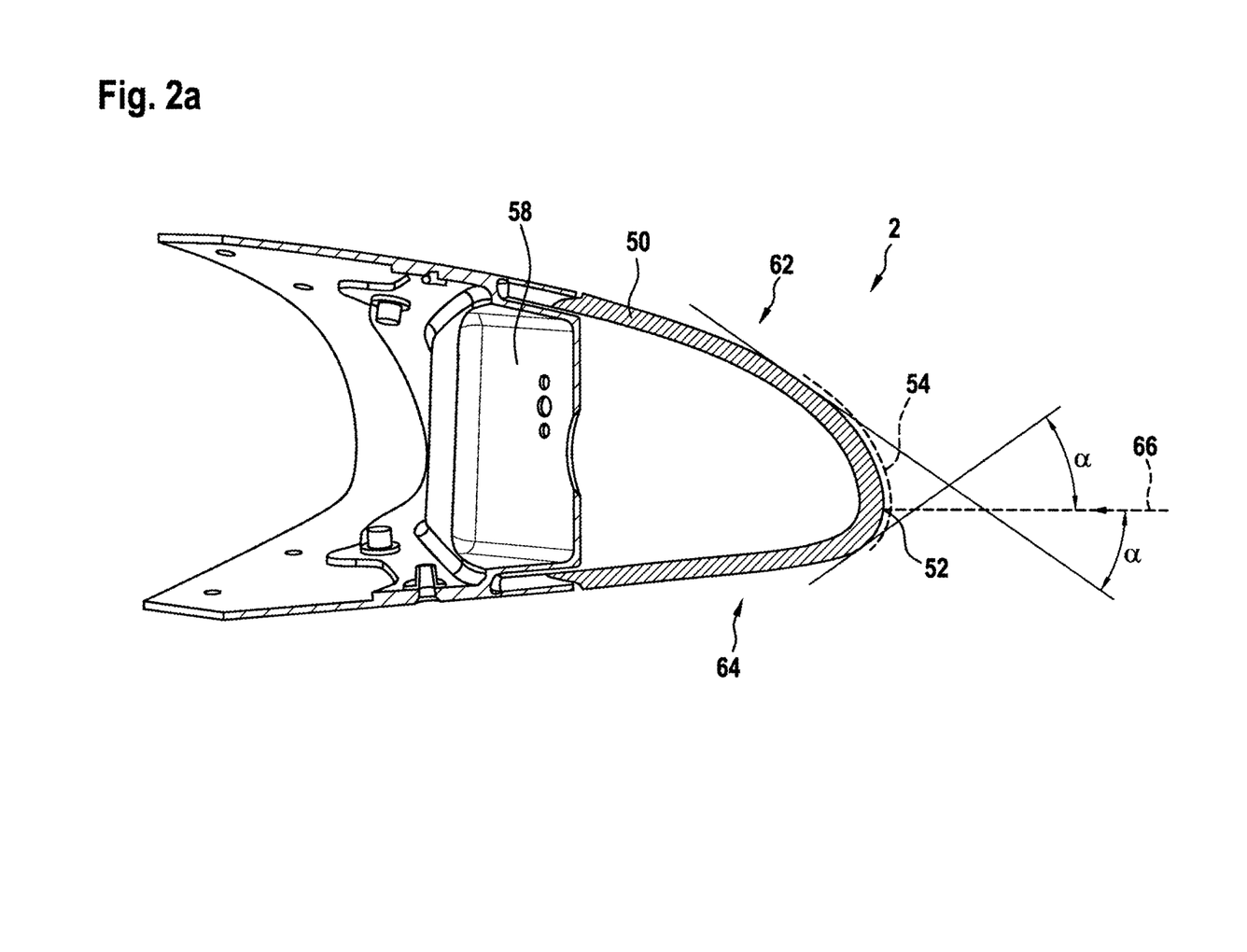
FIG. 2a shows an exterior aircraft light unit in accordance with an exemplary embodiment of the invention in a cross-sectional view, with the light sources and a shutter not being depicted in FIG. 2A.
Figure 2B:
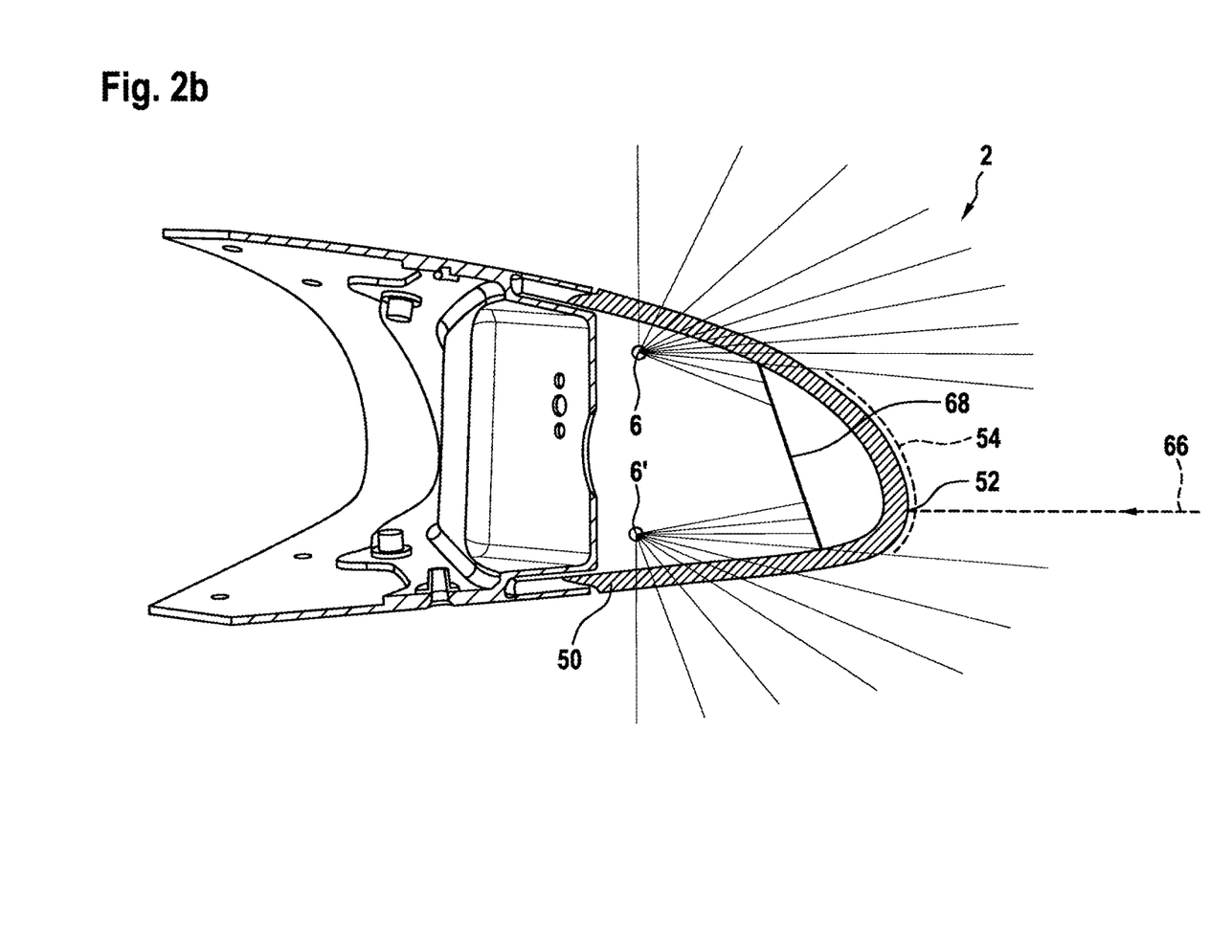
FIG. 2b shows the exterior aircraft light unit of FIG. 2A, including the light sources and shutter as well as exemplary lights rays being depicted.

FIG. 2 shows an exterior aircraft light unit 2 in accordance with exemplary embodiments of the invention in a vertical cross-sectional view. The cross-sectional view is vertical with respect to the normal operating orientation of an airplane, i.e. perpendicular with respect to the generally horizontal orientation of the airplane fuselage and the generally horizontal orientation of the airplane wings. The cross-sectional view of FIG. 2 may be a cross-sectional view trough the exterior aircraft light unit 2 of FIG. 1, cutting through the lens cover 50 and through the housing 56 in the region of the opening 58.

The exterior aircraft light unit 2, as depicted in FIG. 2a, has a cover lens 50 with an upper portion 62, also referred to as first lens cover portion 62, and a lower portion 64, also referred to as second lens cover portion 64. The upper portion 62 has a larger vertical extension than the lower portion 64. In this way, the lens cover 50 blends into the aerodynamic structure of the airplane wing, which provides lift to the airplane.

The border between the upper portion 62 of the lens cover 50 and the lower portion 64 of the lens cover 50 is the aerodynamic front edge 52, which is a single point in the cross-sectional view of FIG. 2a. At the aerodynamic front edge 52, the impinging air stream during flight parts into a portion passing along the upper portion 62 of the lens cover 50 and a portion passing along the lower portion 64 of the lens cover 50. The direction of the impinging air stream is indicated with dashed line 66 in FIG. 2a. While this direction is shown to hit the aerodynamic front edge 52 in FIG. 2a, it is understood that the impinging air stream reaches the lens cover 50 across its entire outer contour.

The lens cover 50 has an aerodynamic front region 54, which extends both towards the top and towards the bottom of the aerodynamic front edge 52. The aerodynamic front region 54 is indicated with a dashed line along the contour of the lens cover 50 in FIG. 2a. The aerodynamic front region 54 of the lens cover 50 is defined as that portion of the lens cover 50 where the outer contour of the lens cover 50 has an angle of $\alpha$ or an angle of greater than $\alpha$ with respect to the direction 66 of the impinging air stream. In other words, the aerodynamic front region 54 of the lens cover 50 is defined as that portion of the lens cover 50 where the tangent to the outer contour of the lens cover 50 has an angle of greater or equal than a with respect to the direction 66 of the impinging air stream. In the exemplary embodiment of FIG. 2, the angle $\alpha$ is 35°. It is also possible that the aerodynamic front region 54 is defined by another angle $\alpha$ between 25° and 45°. With a being 45°, the aerodynamic front region 54 is smaller than depicted in FIG. 2a. With a being 25°, the aerodynamic front region 54 is wider than depicted in FIG. 2a.

For a clearer description of the different portions of the lens cover 50, the exterior aircraft light unit 2 is shown without light sources and optical elements in FIG. 2a. In order to show the optical behaviour and properties of the exterior aircraft light unit 2, a first light source 6 and a second light source 6' are additionally shown in FIG. 2b. For ease of illustration, these two light sources 6 and 6' are shown as point light sources. As will be explained below with reference to FIGS. 4 to 8, the light sources are associated with suitable optical systems for achieving a desired output light intensity distribution. These optical systems are omitted from FIG. 2b for a clearer illustration.

The first and second light sources 6 and 6' are provided in different portions of the exterior aircraft light unit 2. In particular, the first light source 6 is arranged in an upper portion of the exterior aircraft light unit 2 close to the upper portion 62 of the lens cover 50. The second light source 6' is arranged in a lower portion of the exterior aircraft light unit close to the lower portion 64 of the lens cover 50. Both of the first and second light sources 6 and 6' have an opening angle of their light output of more than 100°, in particular between 115° and 125°. The first light source 6 emits light in an angular region between straight up and angled somewhat downwards, while the second light source 6' emits light in an angular range between downwards and angled slightly upwards in the cross-sectional view of FIG. 2b. In this way, the first and second light sources 6 and 6' jointly cover an angular range of about 180° in the cross-sectional view of FIG. 2b.

The exterior aircraft light unit 2 has a shutter 68 arranged between the first and second light sources 6 and 6' and the aerodynamic front region 54 of the lens cover 50. In this way, the shutter 68 blocks light from the first light source 6 as well as light from the second light source 6' from reaching the aerodynamic front region 54 and from exiting the exterior aircraft light unit 2. The exterior aircraft light unit 2 emits light only outside the aerodynamic front region 54 of the lens cover 50. In particular, light from the first light source 6 is only passed through the upper portion 62 of the lens cover 50 upside of the aerodynamic front region 54. Further in particular, light from the second light source 6' is only emitted through the lower portion 64 of the lens cover 50 downside of the aerodynamic front region 54. In this way, when the aerodynamic front region 54 erodes during use and becomes imperfect with respect to passing light, the performance and overall output light intensity distribution of the exterior aircraft light unit 2 is not affected by this erosion. The exterior aircraft light unit 2 can still be used without maintenance and perform as desired, despite an eroded aerodynamic front region of the lens cover 50.

Figure 3:
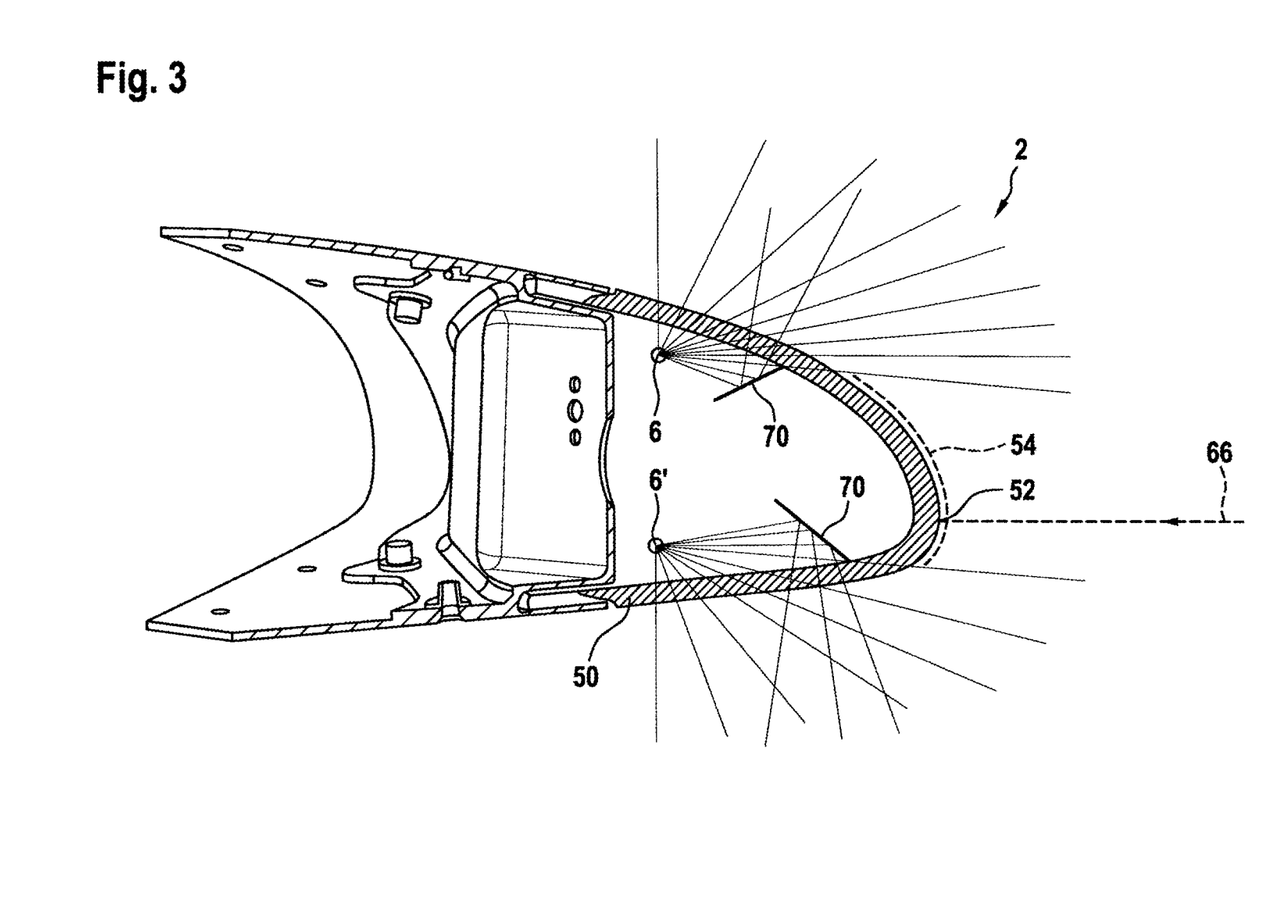
FIG. 3 shows an exterior aircraft light unit in accordance with another exemplary embodiment of the invention in a cross-sectional view.

FIG. 3 shows an exterior aircraft light unit 2 in accordance with another exemplary embodiment of the invention in a vertical cross-sectional view. The exterior aircraft light unit 2 largely corresponds to the exterior aircraft light unit 2 of FIG. 2. However, instead of the shutter 68, two reflectors 70 are provided. These reflectors 70 are light diverting elements that direct light from the first and second light sources 6 and 6', which would reach the aerodynamic front region 54 of the lens cover 50 in the absence of the reflectors 70, towards those portions of the lens cover 50 that lay outside of the aerodynamic front region 54. In this way, it is ensured that no light reaches the aerodynamic front region 54 and light from the first and second light sources 6 and 6' only exits the lens cover 50 outside the aerodynamic front region 54.

In FIGS. 2 and 3, light from the first light source 6 only exits the upper portion 62 of the lens cover 50 and light from the second light source 6' only exits the lens cover 50 through the lower portion 64. This is due to the fact that the light intensity distributions of the first and second light sources 6 and 6' are limited in their opening angle. However, it is also possible that the first and second light sources 6 and 6' have an opening angle of about 180° and that light from the first light source 6 exits the lens cover 50 through its lower portion 64 and that light from the second light source 6' exits the lens cover 50 through its upper portion 62.

Also with respect to both of FIGS. 2 and 3, it is pointed out that light from the first light source 6 forms that portion of the overall output light intensity distribution of the exterior aircraft light unit 2 that is around the direction 66 of the impinging air stream. In this way, the steeper contour of the upper portion 62 of the lens cover 50, as compared to the lower portion 64 of the lens cover 50, is made use of for a favourable coupling out of the light from the first light source 6 over a wider angular range. In particular, the light from the first light source 6 forms the overall output light intensity distribution in an angular range of +/−5° around the direction 66 of the impinging air stream.

With respect to FIGS. 4-8, an exemplary combination of a light source 6 and a lens 8 is described. Said combination of the light source 6 and the lens 8 can be used for both the first light source 6 and the second light source 6', as depicted in FIGS. 2 and 3. In other words, the point light sources of FIGS. 2 and 3, which are provided for ease of illustration, may each be replaced by the combination of the light source 6 and the lens 8, as described hereinafter, for reaching a desired output light intensity distribution of the exterior aircraft light unit 2. The combination of the light source 6 and the lens 8 is suitable for providing an exterior aircraft light unit 2 in accordance with the constructional principles given above, while satisfying FAR regulations for forward navigation lights.

Figure 4:
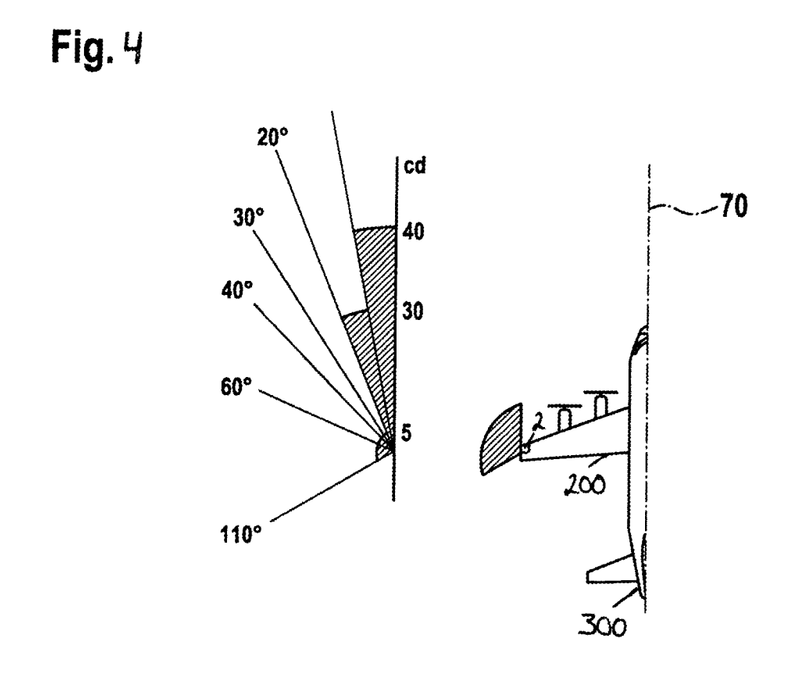
FIG. 4 shows an airplane in accordance with an exemplary embodiment of the invention in a schematic view.

FIG. 4 shows a schematic illustration of an airplane 300 having an exterior aircraft light unit 2 in accordance with an exemplary embodiment of the invention installed in the wing tip region of an airplane wing 200 of the airplane 300. It is illustrated that the illumination of the exterior aircraft light unit 2 covers an angular range between a longitudinal direction 70 of the aircraft 300 and an angle of 110° thereto. It is further illustrated that the exterior aircraft light unit 2 satisfies regulatory requirements for three distinct output regions in the output light intensity distribution, namely the regulatory requirements for a peak region between the longitudinal direction 70 of the aircraft 300 and an angle of 10° thereto, for a medium light intensity region between 10° and 20°, and for a low light intensity region between 20° and 110°. In this way, the exterior aircraft light unit 2 satisfies FAR requirements for forward navigation lights.

Figure 5:
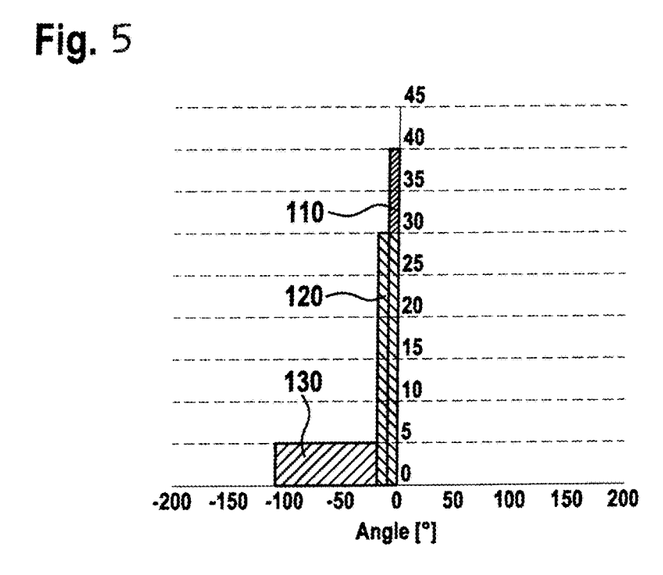
FIG. 5 shows a horizontal light intensity distribution of a navigation light unit in accordance with aviation regulations.

FIG. 5 shows a required light intensity distribution across a first cross-sectional plane, namely a horizontal cross-sectional plane, according to FAR requirements in diagrammatic form. It can be seen that the light intensity values of FIG. 5 correspond to the light intensity values depicted in FIG. 4. A peak region 110, a medium intensity region 120, and a low intensity region 130 are shown for the angular ranges of the output light intensity distribution discussed above with respect to FIG. 4. It is pointed out that this step function represents minimum required values. While an exterior aircraft light unit 2 in accordance with exemplary embodiments of the invention achieves to satisfy these minimum required values, it may also exceed these values, as will be explained below.

Figure 6:
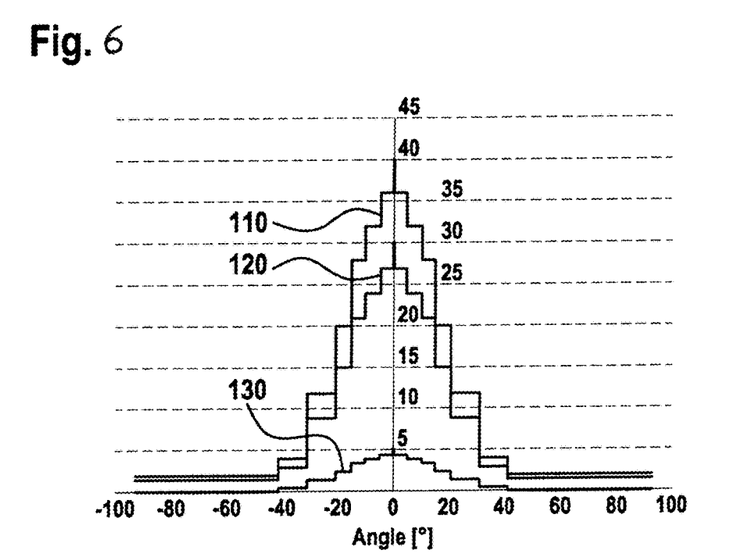
FIG. 6 shows a vertical light intensity distribution of a navigation light unit in accordance with aviation regulations.

FIG. 6 shows a required light intensity distribution across three vertical cross-sectional planes according to FAR requirements in diagrammatic form. The cross-sectional planes are vertical planes through the center of the exterior aircraft light unit 2. As can be seen, the required light intensity is greatest in the horizontal direction, while decreasing both towards the top and towards the bottom. This behaviour is true for all three depicted light intensity distributions. The three light intensity distributions represent different vertical light intensity distributions for the the peak region 110, the medium intensity region 120, and the low intensity region 130, discussed above. Again, the curves of FIG. 6 illustrate required intensity values. The exemplary exterior aircraft light unit 2, as described herein with respect to exemplary embodiments, may satisfy these requirements and may exceed them in certain portions of the light intensity distributions, as will be explained below.

Figure 7:
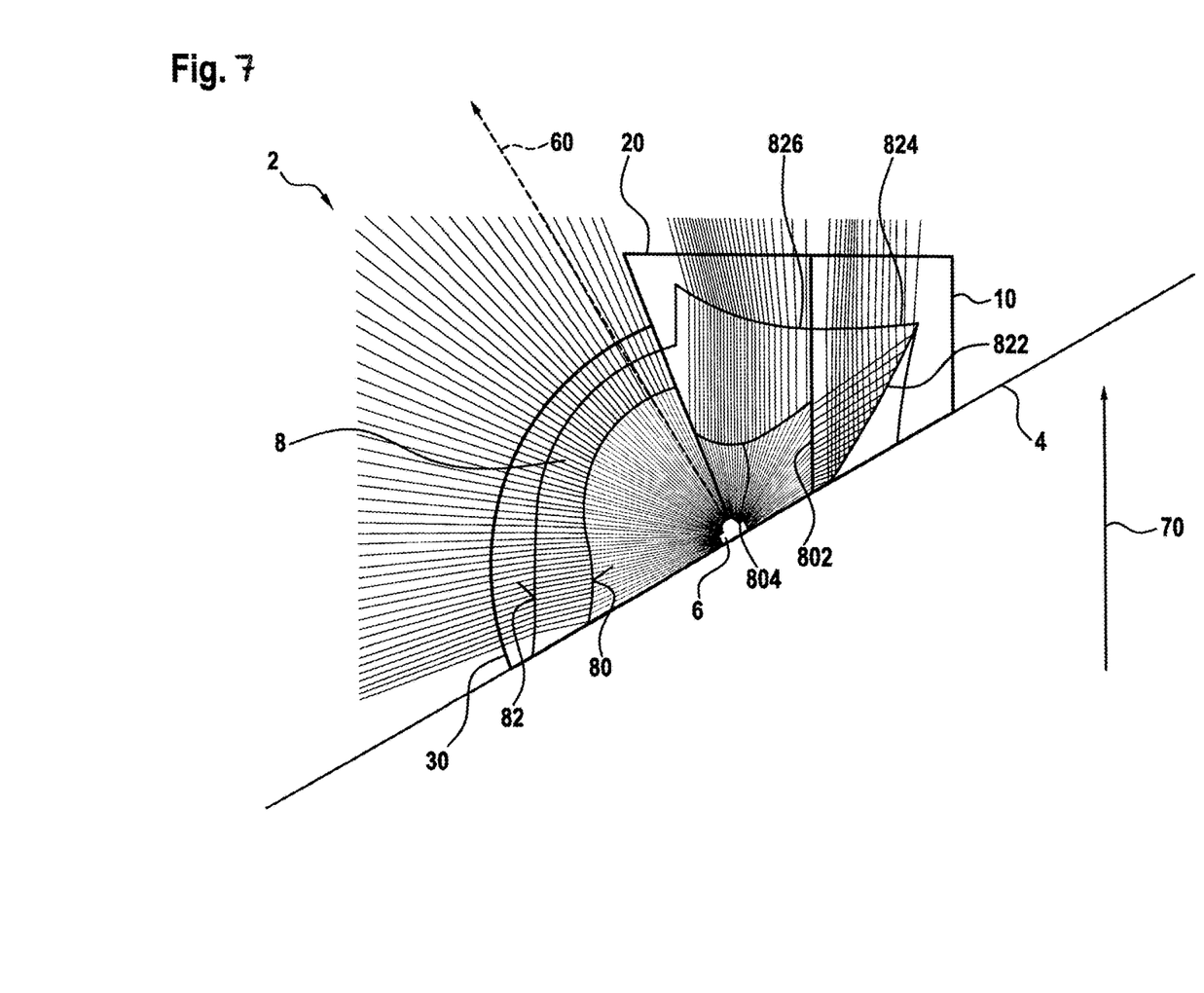
FIG. 7 shows a combination of a light source and an associated optical system, to be used in an exterior aircraft light unit in accordance with an exemplary embodiment of the invention, in a cross-sectional view.

FIG. 7 shows a cross-sectional view of an LED 6 and a lens 8, to be used in an exterior aircraft light unit 2 in accordance with an exemplary embodiment of the invention. In particular, the exterior aircraft light unit 2, as described above with respect to FIGS. 1-3, may comprise a first LED and a first lens, arranged close to the upper portion of the lens cover 50, as well as a second LED and a second lens, arranged close to the lower portion of the lens cover 50, wherein both the first LED and the second LED as well as the both the first lens and the second lens are in accordance with the LED 6 and the lens 8, described herein with respect to FIG. 7. The first and second LEDs form the first and second light sources of the exterior aircraft light unit, and the first and second lenses form the first and second optical systems associated with the first and second light sources, respectively.

The cross-sectional view of the LED 6 and the lens 8 of FIG. 7 is a horizontal cross-sectional view and the combination of the LED 6 and the lens 8 is shown to be oriented in a way as it is oriented after being assembled to the airplane during use. In particular, it is shown that the LED 6 and the lens 8 are at an angle with respect to the longitudinal direction 70 of the airplane.

The LED 6 and the lens 8 are shown to be supported on a support portion 4. The lens 8 is disposed over the LED 6 and is fastened to the support portion 4. The lens 8 fully encloses the LED 6 and affects all light emitted from the LED 6.

The LED 6 has a source-side light intensity distribution, which is Gaussian. A principle light emission direction 60 of the LED 6 is orthogonal to the support portion 4. The principle light emission direction 60 refers to the direction of the highest light intensity of the LED 6 in the absence of all optical elements.

The lens 8 is a solid structure having an inner surface 80 and an outer surface 82. The lens 8 has three distinct transformation segments, namely a first transformation segment 10, a second transformation segment 20, and a third transformation segment 30. The transformation segments 10, 20, 30 transform a source-side light intensity distribution into an output light intensity distribution. The extensions of the transformation segments are defined in terms of their angular regions on the inner surface 80. In particular, the first transformation segment 10 extends over an angle of 30° of the inner surface. This angular range of 30° extends from +90° to +60°, when measured from the principle light emission direction 60. The second transformation segment 20 extends over an angle of 50°. In particular, the second transformation segment extends from +60° to +10°, when measured with respect to the principle light emission direction 60. The third transformation segment 30 extends over an angle of 100°. In particular it extends from +10° to −90°, when measured with respect to the principle light emission direction 60.

The paths of the light rays are described as follows with respect to the individual transformation segments. Within the first transformation segment 10, the light rays from the LED 6 are first slightly refracted at the inner surface 80 of the lens 8. In the cross-sectional plane of FIG. 7, the inner surface 80 has a straight section in the first transformation segment 10, denoted with reference numeral 802. After being slightly refracted, the light rays hit a plane of total internal reflection, denoted with reference numeral 822. At this plane, the light rays are completely reflected towards the top of the drawing plane of FIG. 7, i.e. roughly into the longitudinal direction of the aircraft body 70. The surface 822 of total internal reflection is part of the outer surface 82 of the lens 8. In the cross-sectional plane of FIG. 7, the surface 822 has a straight contour. As the surface 822 of total internal reflection is not planer outside of the drawing plane of FIG. 7, but has a curved shape, the outside contour of the outer surface 82 behind the drawing plane of FIG. 7 is also visible in FIG. 7. After experiencing total internal reflection, the light rays pass a straight portion of the outer surface 82, denoted with reference numeral 824. Only minimal refraction takes place at this surface 824. The light rays leave the lens 8 within a narrow angular range of less than 10° with respect to the longitudinal direction 70 of the airplane. This narrow range between 0° and 10° with respect to the longitudinal direction 70 of the airplane is the peak region of the output light intensity distribution.

In the second transformation segment 20, the light rays from the LED 6 hit a convex portion 804 of the inner surface 80. The portion 804 is convex when viewed from the LED 6. The surface 804 has such a convex shape that the light rays are substantially collimated within the lens 8 in the second transformation segment 20. In other words, the light rays travel through the lens 8 in an aligned manner in the second transformation segment 20. The outer surface 82 of the lens 8 has a concave portion 826 in the second transformation segment 20. The surface 826 is concave when viewed from the outside of the lens 8. This surface 826 disperses the collimated light from within the lens 8 and distributes the light rays across an angular range of 20°. In particular, the light rays are divided up between the longitudinal direction 70 of the airplane and an angle of 20° thereto. In this way, the light rays leaving the second transformation segment 20 contribute to above discussed peak region in the output light intensity distribution and also form a medium intensity region between 10° and 20° with respect to the longitudinal direction 70 of the airplane.

The inner surface 80 and the outer surface 82 are mainly spherical in the third transformation segment 30. In particular, they are both spherical from the border with the second transformation segment 20 to a chamfer region close to the support portion 4. In this chamfer region, the light rays from the LED 6 are somewhat diverted from the support portion through respective chamfer surfaces at the inner surface 80 and at the outer surface 82. In this way, the light rays leaving the third transformation segment 30 are within an angular range of between 20° and 110° with respect to the longitudinal direction 70 of the airplane. This angular region forms a low intensity region of the output light intensity distribution.

With this set-up, the lens 8 allows for a bundling and diverting of light from the LED 6 in such a way that the FAR requirements for forward navigation lights are satisfied.

Figure 8:
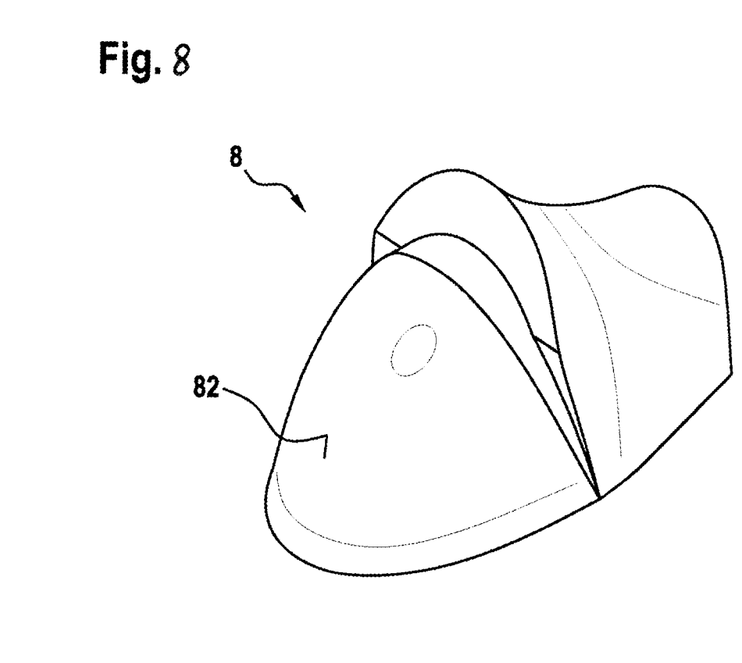
FIG. 8 shows the optical system of FIG. 7 in a perspective view.

FIG. 8 shows the lens 8 of FIG. 7 in a perspective three-dimensional view. As the lens 8 is shown from the outside, only the outer surface 82 is visible in this view. It can be seen that the lens 8 does not only effect the light intensity distribution in the horizontal cross-sectional plane, but also shapes the output light intensity distribution for a wide range of angles with respect to the horizontal plane. In particular, the lens 8 has a shape and configuration to transform the light intensity distribution of the LED 6 into an output light intensity distribution that satisfies the requirements as depicted in FIG. 6 for the vertical cross-sectional planes.

When using the combination of the LED 6 and the lens 8 for each of the first and second light sources 6 and 6' in the exterior aircraft light unit 2 of FIGS. 1-3, each of the two combinations of the LED 6 and the lens 8 emits a light intensity distribution that satisfies the light intensity distribution of the peak region 110, as depicted in FIG. 6, in the cross-sectional plane of FIGS. 2 and 3. In the absence of the shutter 68/the reflectors 70, the two combinations of LED 6 and lens 8 would lead to an over-satisfaction of the light intensity distribution of the peak region 110, as depicted in FIG. 6. However, the shutter 68/the reflectors 70 eliminate any light emission through the aerodynamic front region 54 of the lens cover 50, while the provision of two combinations of LED 6 and lens 8 ensures that the light intensity distribution of the peak region, as depicted in FIG. 6, is satisfied at all angles. While the requirements are largely over-satisfied in some angular regions, they may be barely satisfied in other angular regions.

It is pointed out that the combination of the LED 6 and the lens 8, as described with respect to FIGS. 7 and 8, is an exemplary combination of a light source and an optical system and that various other combinations of light sources and optical systems may be employed for exterior aircraft light units in accordance with exemplary embodiments of the invention. The LED 6 and the lens 8, as described with respect to FIGS. 7 and 8, have been described as an example where a combination of a single light source and a single optical system have been used previously for satisfying FAR requirements. They have further been described as an example of how a doubling of the light source and the associated optical system can be balanced with the blocking of light in the aerodynamic front region of the lens cover, in order to still comply with FAR requirements. However, many other forms of emitting light only outside of the aerodynamic front region of the lens cover and achieving a desired or required output light intensity distribution are possible as well.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An exterior aircraft light unit, comprising:
   a lens cover, and
   at least one light source for emitting light through the lens cover,
   wherein the lens cover has an aerodynamic front edge, separating an impinging air stream during flight, and an aerodynamic front region around the aerodynamic front edge, and
   wherein light emitted by the at least one light source exits the lens cover only outside the aerodynamic front region.

2. The exterior aircraft light unit according to claim 1, further comprising:
   at least one shutter, arranged between the at least one light source and the aerodynamic front region and blocking light emitted by the at least one light source towards the aerodynamic front region.

3. The exterior aircraft light unit according to claim 1, further comprising:
   at least one light diverting element, associated with the at least one light source and configured to direct light, emitted by the at least one light source towards the aerodynamic front region, outside the aerodynamic front region.

4. The exterior aircraft light unit according to claim 1, wherein the lens cover has an outside contour and wherein the aerodynamic front region extends in an area where the tangent to the outside contour has an angle of more than 45° with respect to the impinging air stream.

5. The exterior aircraft light unit according to claim 1, wherein the lens cover has a first lens cover portion and a second lens cover portion, with the first and second lens cover portions being positioned on opposite sides of the aerodynamic front edge, and wherein the at least one light source comprises at least one first light source, arranged closer to the first lens cover portion than to the second lens cover portion, and at least one second light source, arranged closer to the second lens cover portion than to the first lens cover portion.

6. The exterior aircraft light unit according to claim 5, wherein at least a majority of the light, emitted by the at least one first light source and exiting the lens cover outside the aerodynamic front portion, exits the lens cover through the first lens cover portion and wherein at least a majority of the light, emitted by the at least one second light source and exiting the lens cover outside the aerodynamic front portion, exits the lens cover through the second lens cover portion.

7. The exterior aircraft light unit according to claim 5, wherein the at least one first light source has at least one first optical system associated therewith and wherein the at least one second light source has at least one second optical system associated therewith.

8. The exterior aircraft light unit according to claim 7, wherein the at least one first optical system and the at least one second optical system are of corresponding design.

9. The exterior aircraft light unit according to claim 5, wherein the exterior aircraft light unit has an overall output light intensity distribution and wherein only light from the at least one first light source contributes to the overall output light intensity distribution in the direction of the impinging air stream.

10. The exterior aircraft light unit according to claim 9, wherein only light from the at least one first light source contributes to the overall output light intensity distribution in an angular range of +/−5° around the direction of the impinging air stream.

11. The exterior aircraft light unit according to any of claim 5, wherein the at least one first light source is arranged in an upper portion of the exterior aircraft light unit and wherein the at least one second light source is arranged in a lower portion of the exterior aircraft light unit.

12. The exterior aircraft light unit according to claim 1, wherein the lens cover is part of an airplane wing surface or part of an airplane winglet surface or part of a transition surface between an airplane wing and an airplane winglet.

13. The exterior aircraft light unit according to claim 1, wherein the exterior aircraft light unit is one of a navigation light unit, an anti-collision light unit, and a combined navigation and anti-collision light unit.

14. An airplane wing, comprising at least one exterior aircraft light unit in accordance with claim 1, arranged at a leading edge of the airplane wing.

15. An aircraft, comprising:
   at least one exterior aircraft light unit, the unit including:
   a lens cover, and
      at least one light source for emitting light through the lens cover,
      wherein the lens cover has an aerodynamic front edge, separating an impinging air stream during flight, and an aerodynamic front region around the aerodynamic front edge, and
   wherein light emitted by the at least one light source exits the lens cover only outside the aerodynamic front region.

16. The exterior aircraft light unit according to claim 1, wherein the lens cover has an outside contour and wherein the aerodynamic front region extends in an area where the tangent to the outside contour has an angle of more than 35° with respect to the impinging air stream.

17. The exterior aircraft light unit according to claim 1, wherein the lens cover has an outside contour and wherein the aerodynamic front region extends in an area where the tangent to the outside contour has an angle of more than 25° with respect to the impinging air stream.

\* \* \* \* \*